United States Patent [19]
Wong

[11] Patent Number: 5,634,505
[45] Date of Patent: Jun. 3, 1997

[54] REFUELING SYSTEM FOR RACE CARS

[75] Inventor: Tak-Yiu Wong, Cerritos, Calif.

[73] Assignee: J.C. Carter Company, Inc., Costa Mesa, Calif.

[21] Appl. No.: 428,919

[22] Filed: Apr. 25, 1995

[51] Int. Cl.$^6$ .................................................. B67D 5/00
[52] U.S. Cl. .................... 141/349; 141/290; 141/293; 141/346; 141/382; 141/302; 141/389; 137/614.05
[58] Field of Search ...................... 141/346, 348, 141/349, 351–355, 290–293, 59, 302, 382, 387–389; 137/614.04, 614.05

[56] References Cited

U.S. PATENT DOCUMENTS

| | | | |
|---|---|---|---|
| 297,000 | 4/1884 | Paulus | 137/614.05 X |
| 3,034,544 | 5/1962 | Griswold | 141/346 |
| 3,125,135 | 3/1964 | Boyer et al. | 141/290 |
| 3,662,793 | 5/1972 | Calisher et al. | 141/349 X |
| 3,674,061 | 7/1972 | Calisher et al. | 141/349 X |
| 3,851,852 | 12/1974 | Blanchard et al. | 137/614.04 X |
| 3,885,608 | 5/1975 | Ayres | 141/354 |
| 4,502,516 | 3/1985 | Shields | 141/290 |
| 5,244,017 | 9/1993 | Hartmans et al. | 141/5 |

*Primary Examiner*—J. Casimer Jacyna
*Attorney, Agent, or Firm*—Kelly Bauersfeld & Lowry

[57] ABSTRACT

An improved refueling system is provided for faster and safer pit stop refueling of a race car during a race, wherein the system is particularly designed for faster gravity drain flow to fuel from a pitside fuel tank to a fuel cell on the race car. The refueling system comprises an improved fuel nozzle adapted for quick and easy engagement with a mating receiver on the race car. In the course of engaging the fuel nozzle with the receiver, a flow control valve in the nozzle is moved to a full-open position defining a substantially unobstructed flow path for fuel flow through the nozzle at a substantially optimized flow rate to achieve refueling of the race car in the shortest possible time. The fuel nozzle is quickly and easily disengaged from the car receiver, and such disengagement is accompanied by automatic independent closure of the flow control valve. The refueling system additionally includes an improved overflow vent valve for opening a fuel cell vent port during refueling of the car, and for recycling vented fuel to the pitside tank.

23 Claims, 9 Drawing Sheets

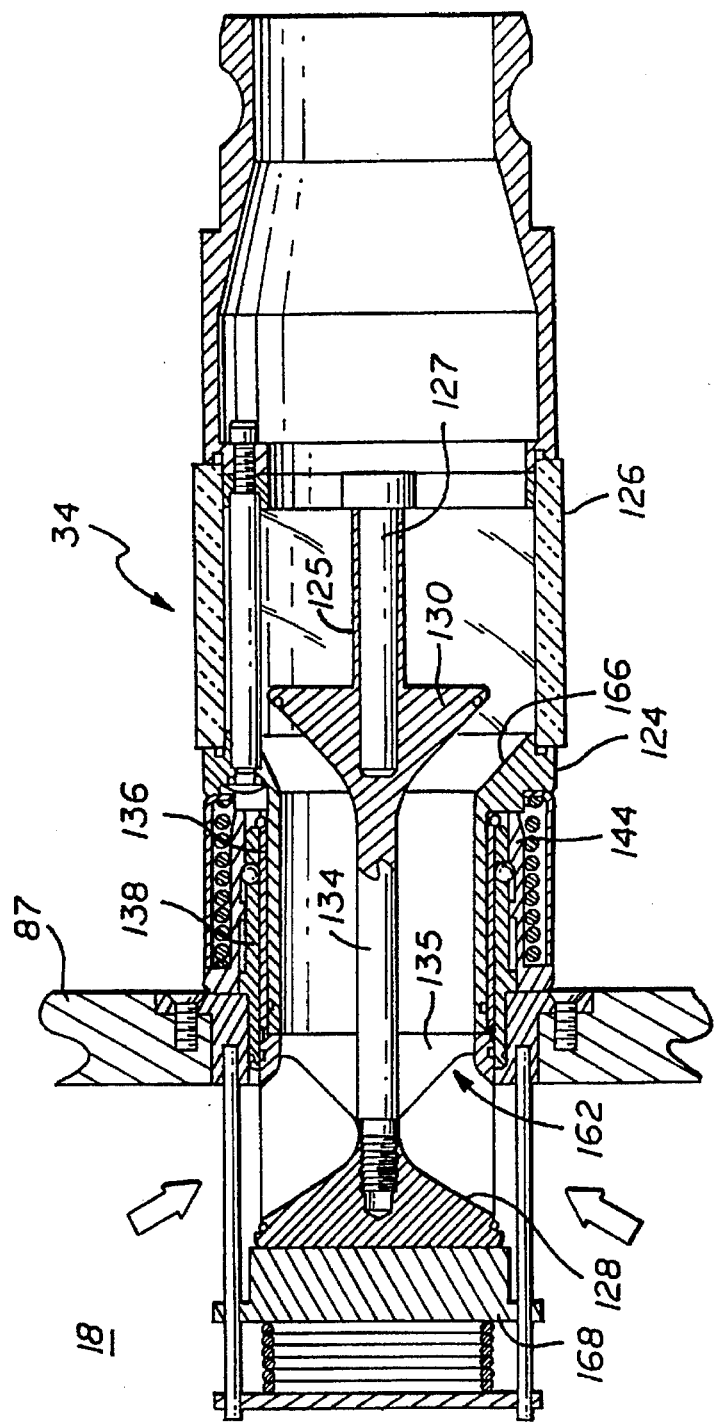
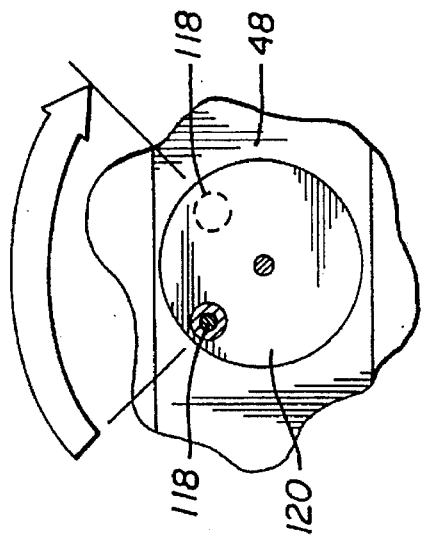
FIG. 10
FIG. 3A

FIG. 6
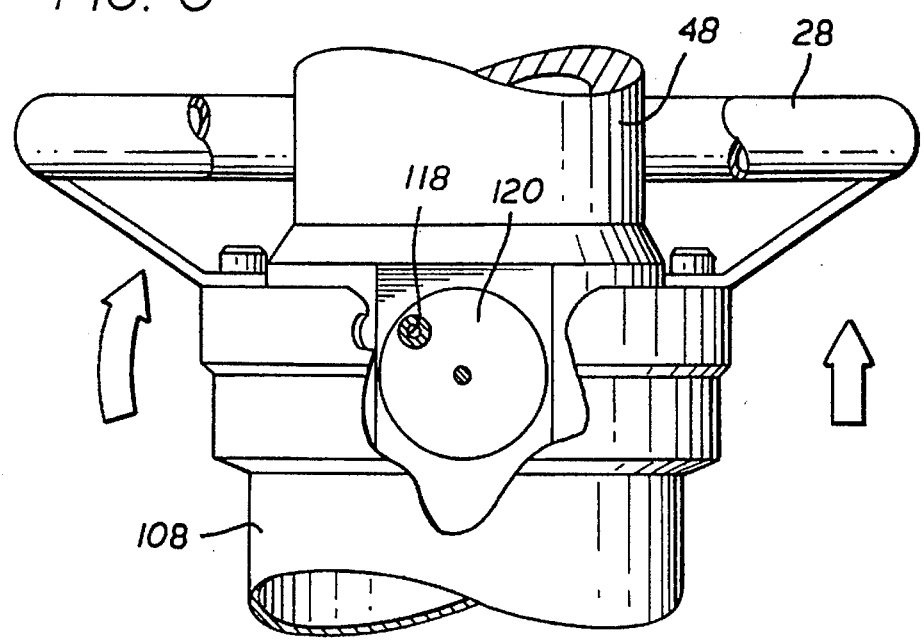
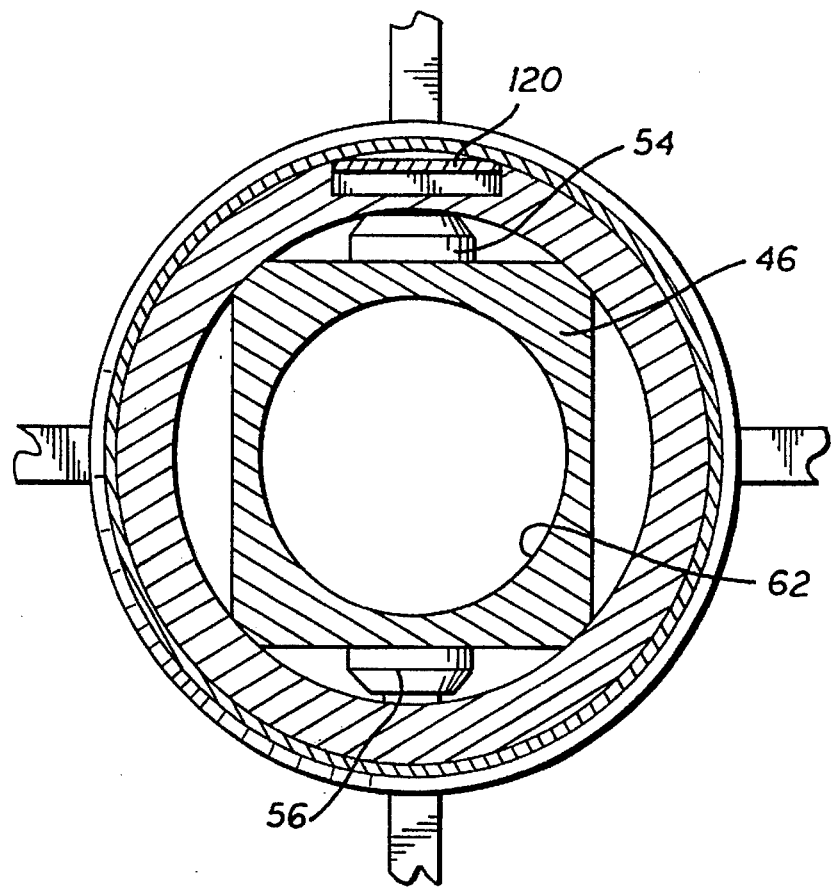
FIG. 7

REFUELING SYSTEM FOR RACE CARS

BACKGROUND OF THE INVENTION

This invention relates generally to refueling systems and related fuel nozzles for use in rapid yet safe refueling of a race car during an automobile race. More specifically, this invention relates to an improved fuel nozzle and related refueling system components for achieving faster and safer refueling of a race car during a pit stop.

Modern automobile racing is an extremely popular spectator sport which attracts the attention of millions of fans throughout the world. Modern race cars are the culmination of sophisticated and costly engineering technologies, including structural frames and materials, aerodynamic designs, and specialized engines. Professional race teams literally spend millions of dollars to develop and maintain a modern race car, such as a so-called Indianapolis type car, for competition in several racing events over the course of a single racing season. Competition among these professional race teams for sponsorship money is intense and the pressure to succeed on the race track is great.

In recent years, the development of race car technology has proceeded in parallel with efforts to improve car and driver safety. To this end, the design and capacity of fuel tanks or fuel cells on the race car have evolved in efforts to reduce the likelihood of explosion and/or fire in the event of a mishap on the race course. Similarly, considerable attention has been given to the prevention of fuel spillage in the pits when a race car is refueled during a race. Prevention of explosion and/or fire in the pits is of special concern in view of the presence of multiperson pit crews as well as the frequent close proximity of spectators. The hazards presented by a fuel-fed fire are particularly critical when a fuel is used such as methanol which burns with a colorless or invisible flame.

By way of further example, over the past few decades, the on-board fuel capacity of a typical race car has been progressively reduced so that the cars carry less fuel during a race, thereby reducing the chances of a fuel spillage and/or fire should a mishap occur. This reduction in fuel tank capacity, however, has necessitated a greater number of pit stops during a typical race event. In this regard, although tire changes and other service activities may be performed during a routine pit stop, the duration of most pit stops is related primarily to the time needed to refill the fuel cell on the car so that the car can resume the race. For any car to be competitive, it is essential for the cumulative time in the pits to be as short as possible. In a typical long distance race, such as the Indianapolis 500, each race car can require 7–10 or more pit stops in order to complete the race. As the race progresses, the speed and efficiency of each pit stop also increases to in effect create a secondary race among pit crews that can be equally important to the primary race on the track. With this in mind, improvements in refueling safety are needed.

Refueling systems for race cars are the subject of specific rules and regulations aimed at preventing safety compromises in order to achieve faster car refueling times. For example, in race events for Indianapolis type cars sponsored by the United States Auto Club (USAC) or Championship Auto Racing Teams (CART), each team is provided with an elevated pitside fuel tank containing a prescribed quantity of approved fuel for use by a single car during a race event. The fuel flows by gravity through a fuel hose to a fuel nozzle adapted for quick-connect coupling with a mating receiver on the car. Such nozzle-receiver connection opens a fuel flow valve in the nozzle, typically in the form of a pivoting butterfly valve plate, to permit gravity drainage of fuel from the pitside tank to the car fuel cell. At the same time, a vent port at the top of the car fuel cell is opened to allow air escape from the fuel cell and thereby permit fuel entry via the fuel nozzle. The vent port is coupled through an overflow vent valve and a recovery hose for recapturing and recycling fumes and overflow fuel to the pitside fuel tank, so that no fuel is spilled or lost. The vent valve typically includes a sight glass to permit viewing of fuel flow therein when the fuel cell reaches a filled condition, at which time the vent port is closed and the fuel nozzle is disengaged from the car. Disengagement of the nozzle from the car is accompanied by closure of the fuel flow valve.

The present invention relates to a race car refueling system of the gravity drain type, as generally described above, but wherein an improved fuel nozzle permits fuel flow to the car at a comparatively faster flow rate but with greater safety, whereby the race car can be refueled in a shorter period of time. By reducing the refueling time needed for each pit stop, the refueling system of the present invention permits a race car to be more competitive particularly during long distance races, by significantly reducing the cumulative time spent in the pits.

SUMMARY OF THE INVENTION

In accordance with the invention, an improved refueling system is provided for refueling a race car during a race time pit stop. The refueling system is particularly designed for faster and safer gravity drain flow of fuel from a pitside fuel tank to a fuel cell on-board the race car. The refueling system includes an improved fuel nozzle having a flow control valve which is moved to a full-open position upon engagement of the fuel nozzle with a mating receiver on the race car. In the full-open position, the flow control valve defines a substantially unobstructed flow path for fuel flow through the nozzle at a substantially optimized flow rate to achieve car refueling in the shortest possible time.

The present invention utilizes a single action that activates two independently operated valves on the fuel nozzle. If the pit crewman operating the fuel nozzle slips or accidently moves away from the race car during refueling, the present invention closes all fuel flow paths. The fuel flow can be reactivated quickly by proper re-insertion of the fuel nozzle into the car receiver, without requiring any manual re-set of valves and eliminating the need for precise rotational alignment between the fuel nozzle and the receiver. As a result, the invention significantly reduces the risk of fuel fire in the pits.

In the preferred form, the fuel nozzle is mounted at the distal end of a fuel hose suspended from an elevated pitside fuel tank. The fuel nozzle comprises a hand-held nozzle housing defining a fuel flow path therethrough. The flow path is normally closed by a flow control valve formed preferably as a ball valve. The flow path is additionally normally closed by a nose valve at a distal or nose end of the fuel nozzle. The nose valve includes a forwardly protruding blunted nose of generally conical shape for self-aligned mated reception with a conically recessed shut-off valve plate mounted on the car receiver and biased to a normally closed position by a spring.

Initial engagement of the fuel nozzle with the car receiver causes the nose of the fuel nozzle to matingly seat within and push open the shut-off valve plate. At the same time, a conical face at the leading end of a valve sleeve engages a conical seat on the receiver to push the valve sleeve in a rearward direction as the nozzle nose is advanced into the receiver, thereby partially opening the nose valve. In close succession thereto, the leading end of a cam sleeve on the fuel nozzle engages the receiver and is pushed rearwardly on the nozzle housing against a biasing spring. The cam sleeve has a cam segment engaging a cam pin for rapidly moving the flow control ball valve to a full-open position. The ball valve defines a flow bore which conforms substantially to the cross sectional size and shape of the nozzle flow path, thereby providing for substantially unobstructed fuel flow through the nozzle and into the car fuel cell.

Removal or disengagement of the fuel nozzle from the car receiver results in sequential return of the flow control ball valve to the closed position followed by reclosure of the nose valve, as the spring-loaded valve and cam sleeves are released in sequence from the receiver. At the same time, the spring-loaded shut-off valve plate of the receiver returns to the closed position. Both operating valves within the fuel nozzle work independently of each other, whereby a failure of one valve, e.g., jammed in an open position, will not prevent proper operation of the other valve.

The refueling system of the present invention additionally includes an improved overflow vent valve for engaging and operating a vent port and related spring-loaded shut-off valve plate of a vent port receiver during a refueling procedure. The improved overflow vent valve opens and connects the vent port to a fuel recovery line which recycles overflow fuel to the pitside fuel tank, as part of the refueling procedure.

More specifically, the overflow vent valve comprises a valve body with a portion thereof defined by a sight glass so that fuel flow therethrough can be visually observed. The vent valve body includes a pair of axially spaced poppet valves carried on a common stem. One of these poppet valves is located at a leading end of the valve body and normally engages a spring-loaded valve sleeve for preventing fluid flow through the valve body. The slidable valve sleeve is normally locked against retraction for opening movement by an outer lock collar coupled to the valve sleeve by a plurality of detent balls.

Upon engagement of the overflow vent valve with a vent port receiver, the lock collar initially engages an end face of the receiver for axial retraction in a manner which unlocks the slidable valve sleeve. The valve sleeve then engages the receiver and is slidably retracted as the first or leading poppet valve is slidably inserted into the vent port receiver to open said vent port. Immediately thereafter, the slidable valve sleeve engages a stop member on a carrier sleeve which supports the two poppet valves for axial sliding motion relative to the vent valve body. Accordingly, further insertion of the vent valve into the vent port receiver causes slidable translation of the carrier sleeve in a direction which opens a second or trailing poppet valve relative to an associated valve seat. Thus, when the vent valve is inserted into the vent port, the first and second poppet valves are opened in rapid succession, to vent the fuel cell through the recovery line to the pitside fuel tank. Subsequent removal of the vent valve from the vent port results in successive and yet independent rapid closure of the second and first poppet valves as the various sleeves and lock collar are returned to their normal closed and locked positions. At the same time, the spring-loaded shut-off valve plate on the vent port receiver returns to the closed position.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3a is fragmented sectional view taken generally on the line 3a—3a of FIG. 3;

FIG. 6 is a fragmented plan view taken generally on the line 6—6 of FIG. 5;

FIG. 7 is a fragmented cross sectional view taken generally on the line 7—7 of FIG. 5;

FIG. 10 is a fragmented sectional view similar to FIGS. 8 and 9, but illustrating full engagement of the overflow vent valve with the vent port receiver.

DETAILED DESCRIPTION OF THE PREFERRED EMBODIMENT

Figure 1:
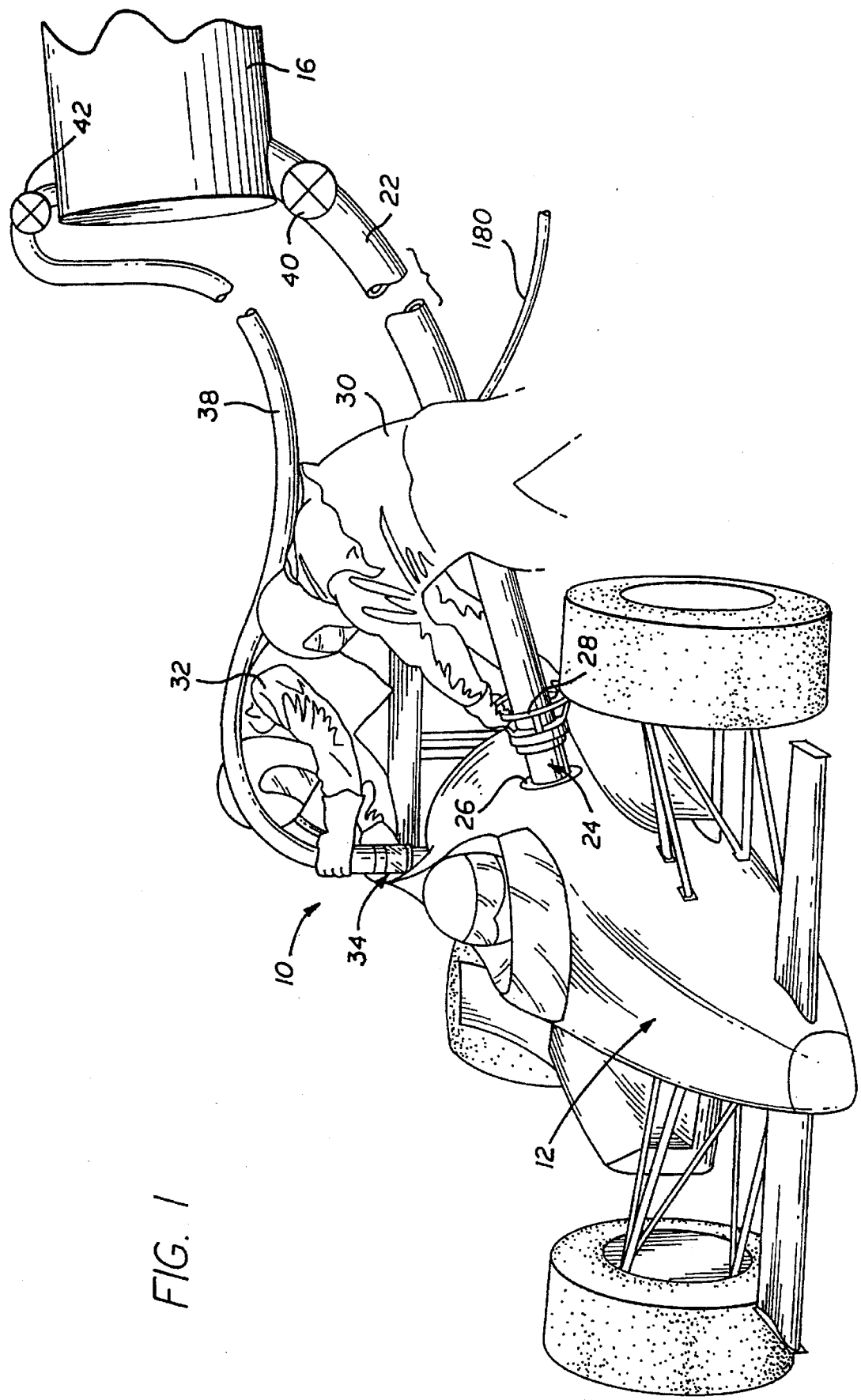
FIG. 1 is a fragmented perspective view illustrating refueling of a race car in accordance with the improved refueling system embodying the novel features of the invention.
Figure 2:
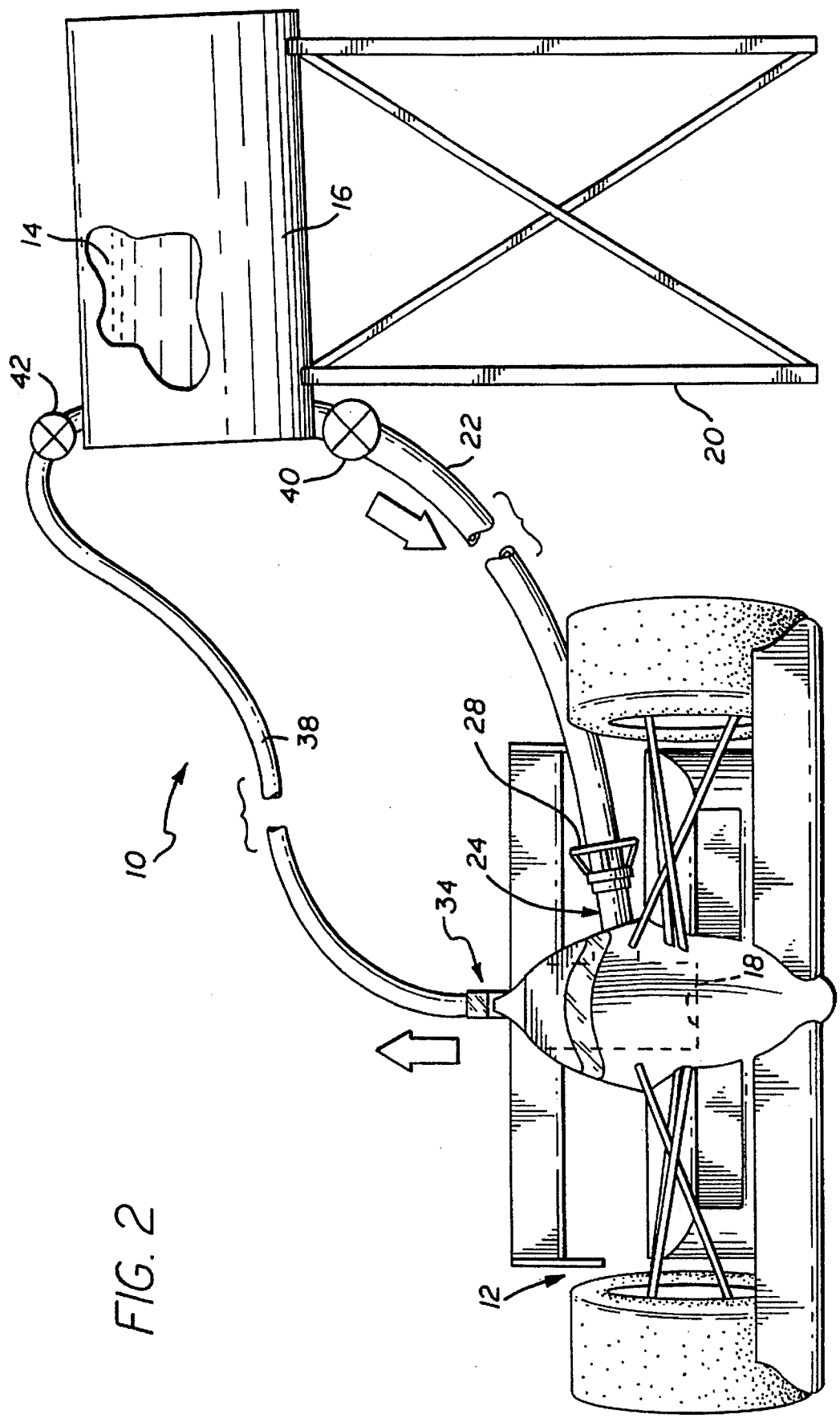
FIG. 2 is a front elevational view depicting the refueling system for gravity flow refueling of a race car, in accordance with the invention.

As shown in the exemplary drawings, an improved refueling system referred to generally in FIGS. 1 and 2 by the reference numeral 10 is provided for rapid refueling of a race car 12 during a pit stop. The refueling system 10 is particularly designed for faster and safer gravity flow drainage of fuel 14 (FIG. 2), from an elevated pitside fuel tank 16 to refill a fuel cell or tank 18 (shown schematically in dotted lines in FIG. 2) on the race car.

In modern automobile racing, it is often necessary for a race car to be periodically refueled in order to complete the prescribed distance of a race event. In this regard, the capacity of the on-board fuel cell 18 is typically limited by regulations imposed by the sanctioning authority of each race, primarily for safety considerations. In the course of a race event, particularly a long distance race such as the Indianapolis 500, each race car may be required to make numerous pit stops primarily for purpose of refueling. The present invention is designed to permit such refueling in a shorter period of time, without compromising safety, and thereby permit the race car to be more competitive by spending more time on the race track and less time in the pits.

The illustrative gravity drain fueling system shown in FIGS. 1 and 2 is typical for many professional racing series, and particularly represents a refueling system of the type required for races involving Indianapolis type cars. In general terms, each racing team is provided with the pitside fuel tank 16 which is supported by a stand 20 (FIG. 2) at a prescribed elevation, typically with a prescribed tilt, and filled with a prescribed quantity of an approved fuel 14. A fuel hose 22 has one end connected to the tank 16 and is suspended therefrom for gravity drain flow of the fuel through a fuel nozzle 24 to the car 12. The fuel nozzle 24 includes seal and valve components to be described in more detail, such that a flow path through the fuel nozzle is opened when said nozzle is engaged with a receiver 26 (FIG. 1) on the car 12. As shown, the fuel nozzle 24 includes a circular hand ring 28 for two-handed manipulation by a pit crew member 30 (FIG. 1) to engage the fuel nozzle 24 with the car receiver 26.

During a refueling procedure, a second pit crew member 32 engages an overflow vent valve 34 with a vent port receiver mounted on the car at the top of the fuel cell 18. The overflow vent valve also includes seal and valve components to be described in more detail, for permitting air to escape from the fuel cell 18 as fuel is delivered to the fuel cell through the fuel nozzle 24. Air and fuel fumes and any overflow fuel spillage is captured by the vent valve 34 for recycling to the pitside fuel tank 16 through a recovery line 38. As shown in FIG. 2, the fuel hose 22 and the recovery line 38 both include safety shut-off valves 40 and 42 at the fuel tank 16.

FIGS. 3-7 illustrates the fuel nozzle 24 in operative relation with the receiver 26 on the race car 12, to achieve substantially optimum gravity flow rate of fuel to the car during a pit stop. In general terms, the improved fuel nozzle 24 of the present invention is designed for rapid and easy yet safe engagement and disengagement with the car receiver 26, so that fuel can be delivered in the shortest possible time but with little or no risk of fuel spillage. The fuel nozzle 24 includes a nose valve 44 in combination with a primary flow control valve 46 in the form of a ball valve, wherein these valves 44, 46 are independently opened sequentially and closed in a reverse sequence as the fuel nozzle is respectively engaged with and disengaged from the car receiver 26.

Figure 3:
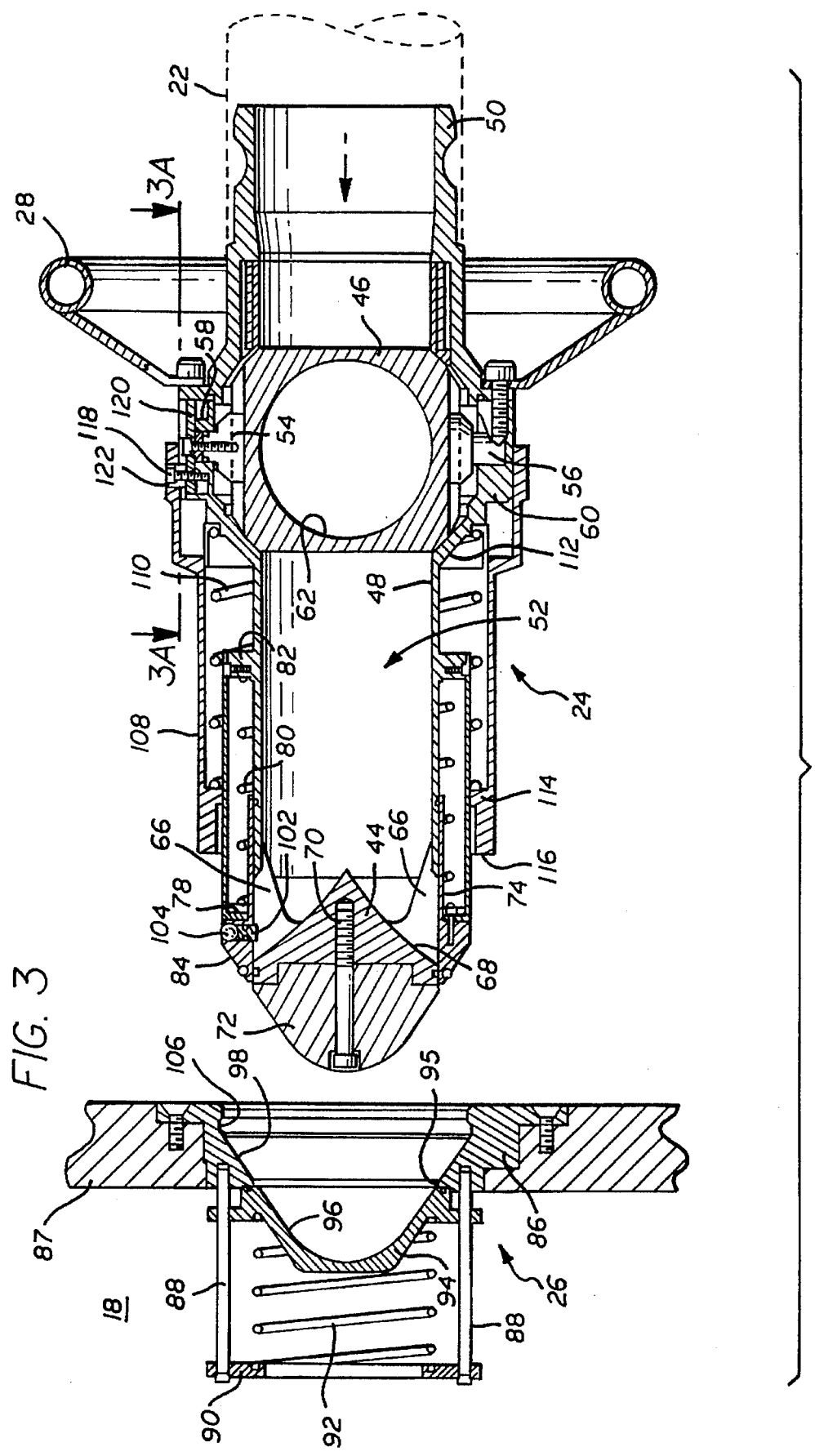
FIG. 3 is an exploded sectional view depicting an improved fuel nozzle in accordance with the invention for mating engagement with a receiver mounted on the race car.

With reference to FIG. 3, the fuel nozzle 24 comprises a generally tubular and hollow nozzle housing 48 having an aft end 50 adapted for clamp-on or other suitable connection to the distal end of the fuel hose 22. The nozzle housing 48 defines a fuel flow path 52 of relatively large cross sectional area. A central region of the housing 48 is radially enlarged to receive and support the ball valve 46 which has oppositely projecting coaxial stem pins 54 and 56 appropriately supported within suitable bearing members 58 and 60, respectively. FIG. 3 illustrates the ball valve 46 in a closed position, with a bore 62 therein extending transversely to the housing flow path 52. Appropriate seal members acting between the ball valve 46 and the housing 48 positively prevent fuel flow leakage past the ball valve 46 in the closed position. Notably, when the ball valve 46 is opened as viewed in FIG. 5, the bore 62 therein cooperates with the housing flow path 52 to define a large and substantially unobstructed fuel flow passage through the nozzle 24.

The nose valve 44 is carried at a front or nose end of the fuel nozzle 24 and provides a secondary valve component for regulating fuel flow. As shown, the nose valve comprises a poppet-type valve member supported by relatively thin radial webs 66 at a leading end of the nozzle housing 48, such that the radial webs 66 space the nose valve 44 axially forwardly of the housing 48 to define radially open discharge ports 68 having a total flow area equal to or exceeding the flow area of the housing flow path 52. A suitable pin 70 attaches a blunted, substantially conically shaped nose piece 72 to the nose valve 44 for mating fitted engagement with the car receiver 26, as will be described. An axially slidable first or inner valve sleeve 74 is carried about the leading end of the nozzle housing 48 for normally closing the discharge ports 68 associated with the nose valve 44. This inner valve sleeve 74 is slidably carried on the nozzle housing 48 and includes a radial shoulder 78 near a front end thereof for spring-biased engagement by a coil spring 80 reacting against a radial flange 82 on the nozzle housing 48. Accordingly, as shown in FIG. 3, the inner valve sleeve 74 is normally urged to a forward position closing the valve discharge ports 68, with a leading edge of the sleeve 74 in sealing engagement with the periphery of the nose valve 44. Importantly, the external geometry of the leading edge of the inner valve sleeve 74 defines a truncated conical surface 84 formed substantially as a continuation of the truncated shape of the nose piece 72.

The car receiver 26 comprises a mounting ring 86 suitably fastened to the car 12 at a position defining one wall 87 of the fuel cell 18. The mounting ring includes a plurality of support rails 88 which project into the interior of the fuel cell 18, with distal ends of said support rails 88 having a backstop ring 90 mounted thereon. A spring 92 reacts against the backstop ring 90 for spring-biased displacement of a shut-off valve plate 94 toward a normal position sealed and seated against an inboard face of the mounting ring 86, to normally close a fuel inflow port 95. Accordingly, when the fuel nozzle 24 is disengaged from the receiver 26, as viewed in FIG. 3, the shut-off valve plate 94 positively closes and seals the fuel cell.

Figure 4:
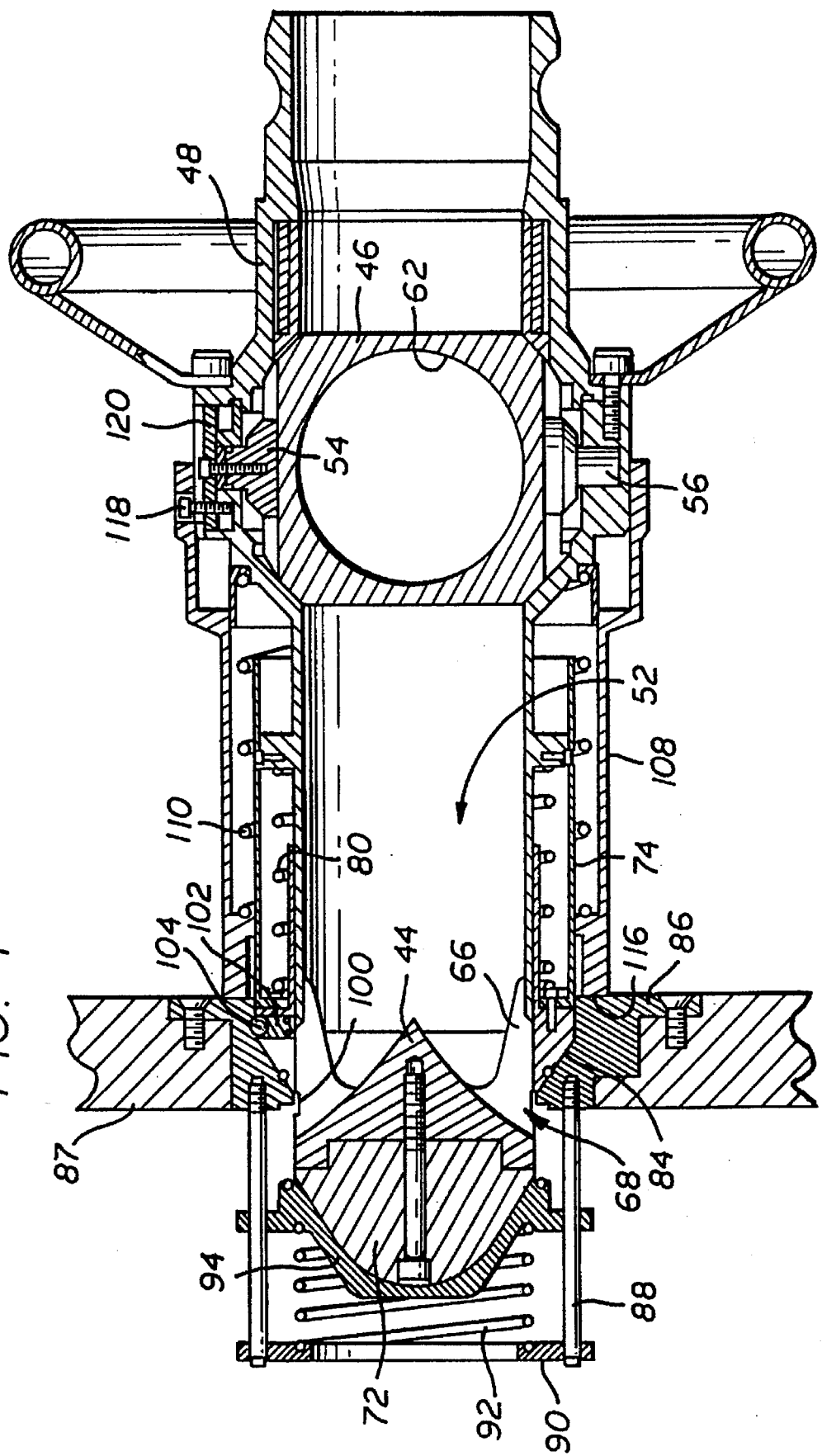
FIG. 4 is an enlarged fragmented sectional view similar to FIG. 3, but illustrating partial engagement of the fuel nozzle with the car receiver.

When the fuel nozzle 24 is initially engaged with the receiver 26, as viewed in FIGS. 3 and 4, the nose piece 72 is matingly and self-guidably received within a conically shaped recess 96 defined by the shut-off valve plate 94. As the nose piece 72 contacts the valve plate 94, the conical leading edge surface 84 of the inner valve sleeve 76 also seats on a conical valve seat 98 on the mounting ring 86. Further push-on movement of the nozzle 24 relative to the receiver 26 causes the nose piece 72 to depress and open the shut-off valve plate 94 which is guided rearwardly along the rails 88, to open the inflow port 95. At the same time, the nose valve 44 displaces forwardly relative to the inner valve sleeve 74 which is seated against the valve seat 98, thereby partially opening the discharge flow ports 68, as viewed in FIG. 4. As shown, this relative movement between the nose valve 44 and the valve sleeve 74 causes detent notches 100 formed in the webs 66 to displace axially beyond detent pins 102 which thereby displace radially outwardly to displace a plurality of circumferentially spaced detent balls 104 into locking engagement with an undercut locking groove 106 in the mounting ring 86. Thus, as the fuel nozzle is opened for fuel flow, the inner valve sleeve 74 is effectively locked in place in engagement with the receiver 26.

Further push-on displacement of the fuel nozzle 24, relative to the receiver 26, operates a cam-type actuator mechanism to result in rapid opening of the ball valve 46. More particularly, a second or outer cam sleeve 108 is movably carried about the inner valve sleeve 74 at the front end of the fuel nozzle housing 48, with a spring 110 reacting between a shoulder 112 on the nozzle housing and a flange 114 on the cam sleeve 108 for normally urging said cam sleeve toward a forward position (FIGS. 3 and 4). However, when the leading end face 116 of the outer cam sleeve 108 comes into contact with an outboard end face of the receiver mounting ring 86, the outer cam sleeve 108 is effectively translated rearwardly, relative to the nozzle housing 48, as the nozzle housing nose is pushed further through and into the receiver 26.

This relative motion of the outer cam sleeve 108, relative to the nozzle housing 48, opens the ball valve 46 by cam action. Specifically, as shown in FIGS. 3-7, a cam pin 118 projects upwardly from a cam plate 120 mounted on the upper ball valve stem pin 54 for rotation therewith. The head of the cam pin 118 is carried within a transversely elongated cam slot 122 formed in the outer cam sleeve 108. Relative rearward displacement of the cam sleeve 108 on the nozzle housing 48 is effective to rotate the cam plate 120 through a stroke of about 90°, as shown in dotted lines in FIG. 3a, resulting in 90° rotation of the ball valve 46 to the full-open position. In this full-open position with the fuel nozzle in locked engagement with the car receiver 26, a substantially unobstructed fuel flow passage is provided for rapid gravity drain fuel flow into the car fuel cell 18. Importantly, this unobstructed fuel passage permits fuel to flow at a substantially optimized flow rate, such that the refueling time is substantially minimized.

Figure 5:
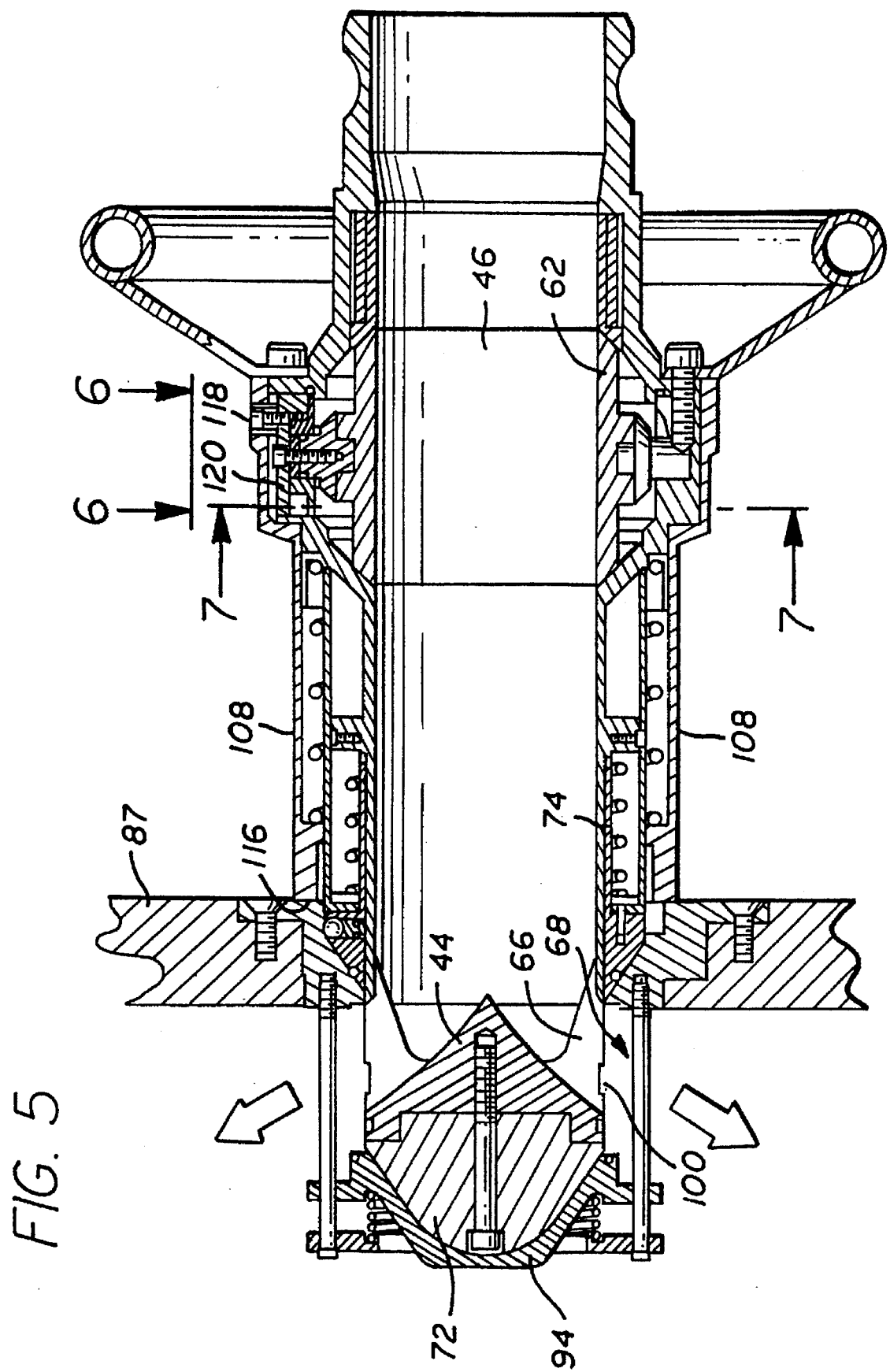
FIG. 5 is a fragmented sectional view similar to FIGS. 4 and 5, but illustrating full engagement of the fuel nozzle with the car receiver.

The use of the ball valve 46 as the primary flow control element is especially advantageous in comparison with prior fuel nozzles of the type employing a standard butterfly valve plate. That is, as shown in FIG. 5, the ball valve 46 in the full-open position provides an unobstructed fuel flow passage. By contrast, a typical butterfly valve plate as used in prior fuel nozzles for race car applications provides a flow path obstruction in the open position on the order of 15–25%. The present invention, by providing an unobstructed flow path, has been found to result in substantial reduction in the time needed to refuel a race car. In this regard, the improved refueling times are particularly significant late in a race event when the level of fuel in the pitside tank 16 has been lowered as a result of several prior refueling pit stops. In other words, the improvements achieved by the present invention are more significant when the pressure head on the fuel 14 is reduced below a maximum level.

The fuel nozzle 24 is additionally beneficial since proper nozzle engagement with the car receiver 26 occurs in a mated fit, self-guiding manner. The pit crewman 30 can manipulate the fuel nozzle 24 with both hands on the hand ring 28 at all times. Opening of the fuel nozzle 24 occurs automatically and in a safety-conscious manner by proper push-in engagement with the receiver 26, without regard to rotational orientation of the nozzle relative to the receiver. The pit crewman is not required to cock or otherwise manipulate any valve component which could undesirably cause the crewman to attempt to manipulate the nozzle with one hand.

The fuel nozzle 24, as described above, is disengaged from the car receiver 26 by mere pull-off removal, with the result that the ball valve 46 and the nose valve 44 close in rapid succession. More specifically, retraction of the fuel nozzle 24 from the car results in spring-biased advancement of the outer cam sleeve 108 on the nozzle housing 48, such that the cam pin 118 and cam plate 120 are rotated back to the solid line position shown in FIG. 3a, with the ball valve fully closed (FIGS. 3 and 4). Continued withdrawal of the fuel nozzle from the receiver 26 enables the spring 80 to effectively advance the inner valve sleeve 74 on the nozzle housing 48. This relative motion continues until the discharge ports 68 are closed, at which time the detent pins 102 are again aligned with the detent notches 100 in the webs 66. This permits the detent balls 104 to unlock from the receiver locking groove 106, and correspondingly permits pull-off separation of the fuel nozzle 24 from the car.

In accordance with one important aspect of the invention, the inner and outer valve sleeves 74 and 108 operate independently to provide for independent operation of the related valves 44 and 46. Thus, in the event of failure of one component, such as hang-up or breakage of the related spring 80 or 110, the other components provide a safety backstop to ensure nozzle closure thereby reducing or eliminating fuel spillage.

Figure 8:
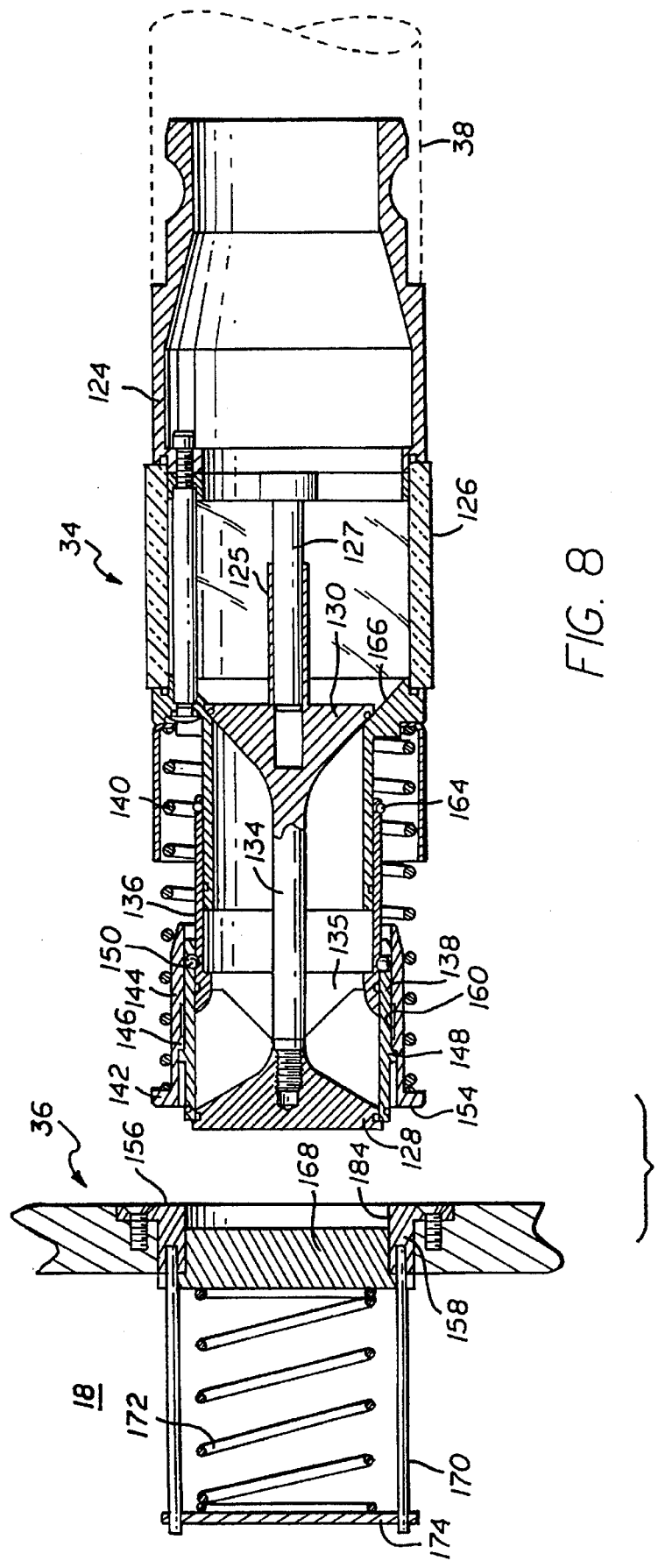
FIG. 8 is an enlarged and exploded fragmented sectional view illustrating an improved overflow vent valve in accordance with the refueling system of the present invention for engaging a port port receiver on the race car.
Figure 9:
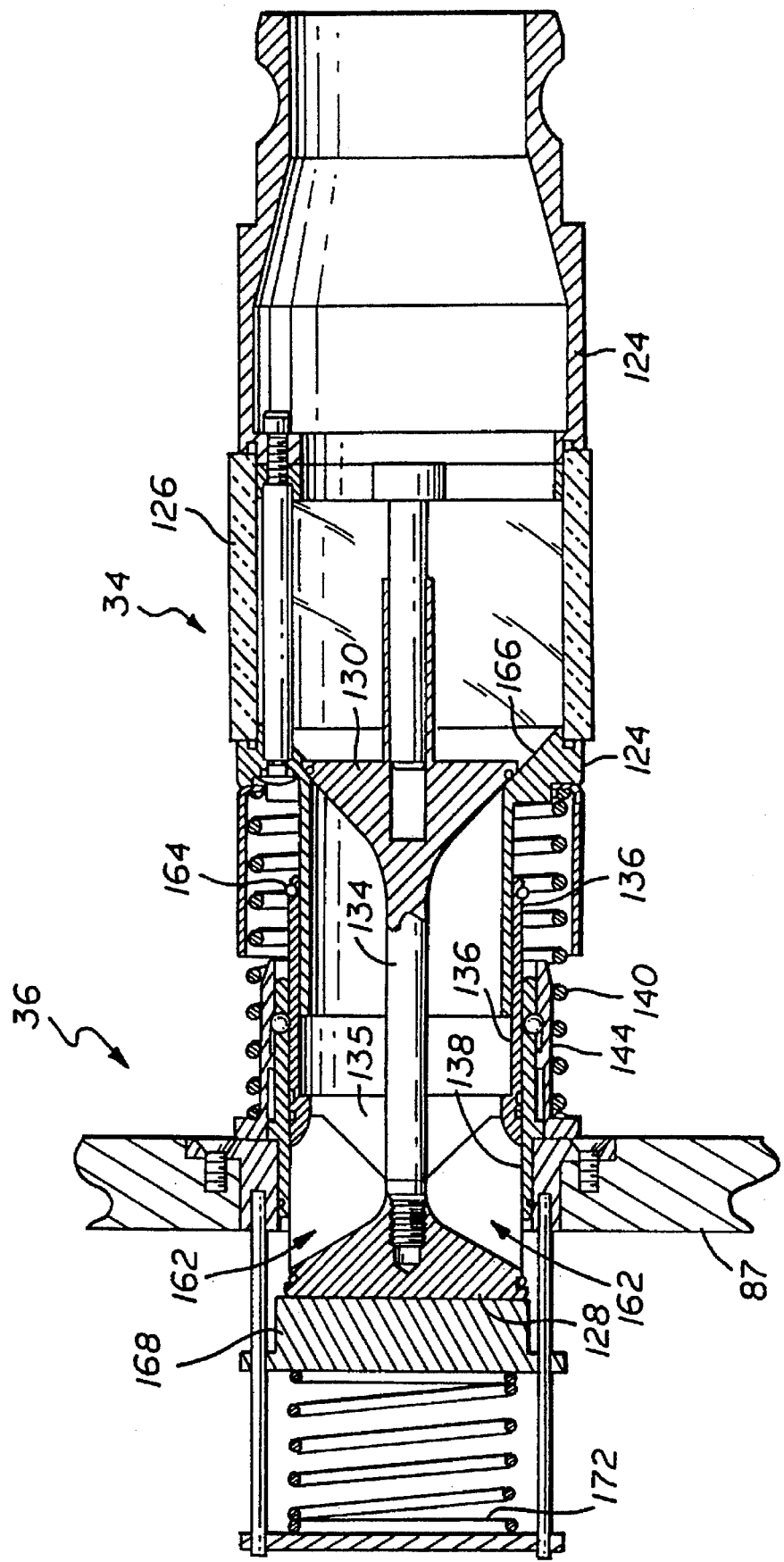
FIG. 9 is a fragmented sectional view similar to FIG. 8, and illustrated partial engagement of the overflow vent valve with the vent port receiver.

FIGS. 8–10 show the preferred overflow vent valve 34 of the refueling system 10 of the present invention, in combination with a vent port receiver unit 36 at the top of the fuel cell 18. As shown, the overflow vent valve 34 also comprises a generally tubular hollow valve body 124 having an aft or rear end adapted for suitable clamp-on connection or the like to the distal end of the recovery line 38. A portion of the valve body 124 is defined by a transparent sight glass 126 to permit visual observation of fuel flow therethrough. Redundant valve members shown in the form of first and second poppet valves 128 and 130 are provided on a common poppet stem 134 for providing redundant valve closure.

More specifically, as shown in FIG. 8, the stem 134 of the poppet valves 128, 130 is connected by radially extending webs 135 to the leading end of a carrier sleeve 136 slidably mounted at a leading end of the valve body 124. The carrier sleeve 136 in turn slidably supports an outer valve sleeve 138 which protrudes forwardly therefrom with a leading end in normally sealed and seated engagement with the periphery of the first poppet valve 128. A compression spring 140 is carried about this forward end of the valve body 124, and reacts against a shoulder 142 to urge an outer lock collar 144 in an axially forward or advanced direction. An inner flange lip 146 on the lock collar engages a rim 148 on the outer valve sleeve 138 for urging said outer valve sleeve 138 to the normally closed position, as described above. In this position, the lock collar 144 engages detent balls 150 carried in apertures on the valve sleeve 138 for reception into detent seats in the carrier sleeve 136, thereby preventing relative displacement between the carrier and outer valve sleeves 136, 138.

When the leading end of the overflow vent valve 134 is engaged with the vent valve unit or receiver 36, an end face 154 on the lock collar 144 engages an end face 156 on a receiver mounting ring 158. Further movement of the vent valve into the receiver 36 causes the lock collar 144 to effectively retract on the outer valve sleeve 138, against the spring 140. When the lock collar 144 retracts sufficiently to capture the detent balls within an internal groove 160, the outer valve sleeve 138 is released from the carrier sleeve 136 for rearward sliding motion thereon. At this time, the rim 148 on the outer valve sleeve 138 engages the end face of the receiver, whereby the valve sleeve 138 is effectively displaced rearwardly to open the flow ports 162 (FIG. 9) defined between the poppet valve 128 and the leading edge of the carrier sleeve 136.

The outer valve sleeve 138 eventually engages a ring stop 164 on the carrier sleeve 136 near the rearward end thereof. When this occurs, further relative rearward motion of the outer valve sleeve 138 is accompanied by rearward motion of the carrier sleeve 136. As shown in FIG. 10, such rearward motion of the carrier sleeve 136 causes the second poppet valve 130 to open relative to a conical valve seat 166 defined within the valve body 124. During this motion, a stem sleeve 125 is guided on a stem guide 127.

The vent port receiver 36 is constructed similar to the fuel port receiver 26, to include a shut-off valve plate 168 carried on rails 170 for spring-loaded advancement by a spring 172 to a normally closed position. The spring 172 reacts as shown in FIGS. 8–10, against a backstop ring 174 to urge the valve plate 168 to the closed position. When the poppet valve 128 at the leading end of the vent valve 34 is pressed against the shut-off valve plate 168, with the lock collar 144 and valve sleeve 138 engaging the mounting ring 158, the shut-off valve plate 168 is retracted against the spring 172 as viewed in FIGS. 9 and 10, to open the fuel cell vent port as the overflow vent valve 24 is opened.

The overflow vent valve 36, as described above, can be engaged quickly and easily with the vent port receiver 36 as a one-handed operation. In this regard, the crewman 32 responsible for the vent valve 34 is often also responsible for connecting a pneumatic conduit 180 (FIG. 1) to the car 12 to power an on-board pneumatic jack used to lift the car and thereby facilitate tire changes. Engagement of the vent valve 34 with the receiver 36 to open the two poppet valves 128, 130 cannot occur until the outer lock collar 144 is properly engaged with the receiver 36. Since the leading end of the outer valve sleeve 138 protrudes a short distance beyond the lock collar 144, such engagement between the collar 144 and the receiver 36 does not occur unless and until the valve sleeve 138 is properly fitted into a shallow seat 184 on the outboard side of the shut-off valve plate 168. Subsequent separation of the vent valve 34 from the receiver 36 occurs easily by mere pull-off withdrawal of the vent valve, with the spring 140 effectively assisting such separation.

With the vent valve 34 thus fully engaged with the vent port receiver 36, the fuel cell 18 is vented through the recovery line 38 to the pitside fuel tank 16, thereby permitting air escape from the fuel tank and consequently also permitting rapid fuel inflow through the nozzle 24. Fuel fumes and vapors are recovered to the fuel tank 16, via the recovery line 38. When the fuel cell 18 reaches a filled condition, fuel will start to overflow through the vent port into the vent valve 36, where it can be visually observed by the pit crew member 32 (FIG. 1). When this overflow fuel is observed through the sight glass 126, the pit crew member 32 rapidly removes the vent valve 34 from the vent port 36. Such rapid removal causes the vent port to close, and thereby terminates fuel flow to the vehicle. Importantly, the spring 140 causes the carrier sleeve 136 and outer valve sleeve 138 to undergo a reverse displacement in rapid sequence, for corresponding successive closure of the poppet valves 130 and 128. Fuel spillage is thus minimized and/or eliminated, with any fuel overflow being captured within the vent valve 34 for subsequent gravity drainage back to the pitside fuel tank 16. Of course, when the vent valve 34 is removed from the car 12, the fuel nozzle 124 is also removed as previously described, so that the car 12 can resume the race.

A variety of modifications and improvements to the refueling system 10 of the present invention will be apparent to persons skilled in the art. Accordingly, no limitation on the invention is intended by way of the forgoing description and accompanying drawings, except as set forth in the appended claims.

What is claimed is:

1. A refueling system for delivering fuel from a pitside fuel tank to a fuel cell on a race car, said refueling system comprising:

a receiver adapted to be mounted on the race car and including a mounting ring defining a fuel inflow port for delivery of fuel into the fuel cell, said receiver having a shut-off valve plate and means for biasing said shut-off valve plate to a normal position closing said fuel inflow port;

a fuel nozzle having a hollow nozzle housing defining a fuel flow passage therethrough, a flow control valve mounted along said fuel flow passage and movable between a closed position preventing fuel flow therethrough and an open position permitting substantially unobstructed fuel flow through said fuel flow passage, and actuator means for engaging said receiver upon push-in reception of said nozzle into said fuel inflow port to move said shut-off valve plate to a position opening said fuel inflow port and to move said flow control valve to said open position;

said actuator means comprising a cam sleeve carried about said nozzle housing for reciprocal axial sliding movement thereon, said cam sleeve having one end for engaging said mounting ring upon reception of said fuel nozzle through said fuel inflow port to result in axial displacement of said cam sleeve in one direction relative to said nozzle housing, cam means coupled between said cam sleeve and said flow control valve for moving said flow control valve to said open position upon displacement of said cam sleeve in said one direction relative to said nozzle housing, and spring means for urging said cam sleeve to displace axially on said nozzle housing in an opposite direction for normally moving said flow control valve to said closed position, whereby said spring means moves said flow control valve to said closed position upon pull-out removal of said nozzle from said receiver; and hose means for connecting said nozzle housing to said pitside fuel tank.

2. The refueling system of claim 1 wherein said flow valve comprises a ball valve having a bore formed therein with a size and shape for substantial conformance to the cross sectional size and shape of said fuel flow passage.

3. The refueling system of claim 1 wherein said shut-off valve plate defines an outwardly presented recess of generally conical shape, and further wherein said fuel nozzle includes a nose of generally conical shape for substantially mated and self-guiding reception into said recess in said shut-off valve plate when said fuel nozzle is received into said fuel inflow port.

4. The refueling system of claim 1 further including a generally circular hand ring mounted on said nozzle housing.

5. The refueling system of claim 1 further including a vent port unit adapted to be mounted on the race car and defining a vent port disposed generally at the top of said fuel cell, said vent port unit including a shut-off valve plate and means for biasing said shut-off valve plate to a normal position closing said vent port, a vent valve for releasibly engaging said vent port unit to open said vent port and thereby allow the car to be refueled via said fuel inflow port, and a recovery line for connecting said vent valve to said pitside fuel tank.

6. The refueling system of claim 5 wherein said vent valve includes a tubular valve body with at least a portion of said valve body being transparent to permit visual observation of fuel therein.

7. A refueling system for delivering fuel from a pitside fuel tank to a fuel cell on a race car, said refueling system comprising:

a receiver adapted to be mounted on the race car and including a mounting ring defining a fuel inflow port for delivery of fuel into the fuel cell, said receiver having a shut-off valve plate and means for biasing said shut-off valve plate to a normal position closing said fuel inflow port;

a fuel nozzle having a hollow nozzle housing defining a fuel flow passage therethrough, a flow control valve mounted along said fuel flow passage and movable between a closed position preventing fuel flow therethrough and an open position permitting substantially unobstructed fuel flow through said fuel flow passage, and actuator means for engaging said receiver upon push-in reception of said nozzle into said fuel inflow port to move said shut-off valve plate to a position opening said fuel inflow port and to move said flow control valve to said open position;

said actuator means including a nose valve mounted generally at a leading end of said nozzle housing by at least one radial web whereby said nose valve cooperates with said housing to define a discharge passage leading from said fuel flow passage, a valve sleeve slidably carried by said nozzle housing generally at said housing leading end, first spring means for biasing said valve sleeve to a normal closed position sealably engaged with said nose valve for closing said discharge passage, said valve sleeve having a leading end face for engaging said mounting ring upon engagement of said nozzle with said receiver to permit said nose valve to be push-in received through said fuel inflow port whereby said valve sleeve is displaced relative to said nozzle housing to an open position permitting fuel flow from said fuel flow passage and through said discharge passage into said fuel cell, said first spring means causing said valve sleeve to displace on said nozzle housing in a relative opposite direction upon pull-out removal of said nozzle from said receiver whereby said valve sleeve is returned to its closed position;

said actuator means further including a cam sleeve carried about said nozzle housing for reciprocal axial sliding motion thereon, said cam sleeve having one end for engaging said mounting ring upon engagement of said fuel nozzle with said receiver to result in axial displacement of said cam sleeve in one direction relative to said nozzle housing, cam means coupled between said cam sleeve and said flow control valve for moving said flow control valve to said open position upon displacement of said cam sleeve in said one direction relative to said nozzle housing, and second spring means for urging said cam sleeve to displace axially on said nozzle housing in an opposite direction for normally moving said flow control valve to said closed position, whereby said second spring means moves said flow control valve to said closed position upon pull-out removal of said nozzle for said receiver and hose means for connecting said nozzle housing to the pitside fuel tank.

8. The refueling system of claim 7 wherein said valve sleeve is carried about said nozzle housing, and further wherein said cam sleeve is carried about said valve sleeve.

9. The refueling system of claim 7 wherein said leading end face of said valve sleeve is positioned for engaging said mounting ring prior to engagement of said cam sleeve with said mounting ring upon push-in engagement of said fuel nozzle with said receiver whereby said discharge passage is opened prior to movement of said flow control valve to said open position, and further whereby said flow control valve is moved to said closed position prior to closure of said discharge port upon pull-out removal of said fuel nozzle from said receiver.

10. The refueling system of claim 7 wherein said leading end face of said valve sleeve has a truncated conical shape, and further wherein said mounting ring has a truncated conical seat surface for seated engagement with said valve sleeve leading end face.

11. The refueling system of claim 7 wherein said nose valve carries a nose piece of generally truncated conical shape for mated and self-aligned reception into a matingly shaped recess formed in said shut off valve plate.

12. The refueling system of claim 7 wherein said flow control valve is a ball valve.

13. The refueling system of claim 7 wherein said mounting ring and said valve sleeve include detent means for releasibly locking said valve sleeve with said mounting ring upon push-in engagement of said fuel nozzle with said receiver to move said shut-off valve plate to the open position.

14. A refueling system for delivering fuel from a pitside fuel tank to a fuel tank on a race car, said refueling system comprising:

a receiver adapted to be mounted on the race car and including a mounting ring defining a fuel inflow port for delivery of fuel into the fuel cell, said receiver having a shut-off valve plate and means for biasing said shut-off valve plate to a normal position closing said fuel inflow port;

a fuel nozzle having a hollow nozzle housing defining a fuel flow passage therethrough, a flow control valve mounted along said fuel flow passage and movable between a closed position preventing fuel flow therethrough and an open position permitting substantially unobstructed fuel flow through said fuel flow passage, and actuator means for engaging said receiver upon push-in reception of said nozzle into said fuel inflow port to move said shut-off valve plate to a position opening said fuel inflow port and to move said flow control valve to said open position;

said actuator means including a nose valve mounted generally at a leading end of said nozzle housing by at least one radial web whereby said nose valve cooperates with said housing to define a discharge passage leading from said fuel flow passage, a valve sleeve slidably carried by said nozzle housing generally at said hoising leading end, first spring means for biasing said valve sleeve to a normal closed position sealably engaged with said nose valve for closing said discharge passage, said valve sleeve having a leading end face for engaging said mounting ring upon engagement of said nozzle with said receiver to permit said nose valve to be push-in received through said fuel inflow port whereby said valve sleeve is displaced relative to said nozzle housing to an open position permitting fuel flow from said fuel flow passage and through said discharge passage into said fuel cell, said first spring means causing said valve sleeve to displace on said nozzle housing in a relative opposite direction upon pull-out removal of said nozzle from said receiver whereby said valve sleeve is returned to its closed position; and hose means for connecting said nozzle housing to said pitside fuel tank;

said receiver further including a plurality of slide rails extending from said mounting ring into said fuel cell, and a backstop member on said rails within said fuel cell, said shut-off valve plate being slidably carried on said rails and said biasing means reacting between said backstop member and said shut-off valve plate for urging said valve plate normally to said closed position.

15. A refueling system for delivering fuel from a pitside fuel tank to a fuel cell on a race car, said refueling system comprising:

a receiver adapted to be mounted on the race car and defining a fuel inflow port for delivery of fuel into the fuel cell, said receiver having a shut-off valve plate and means for biasing said shut-off valve plate to a normal position closing said fuel inflow port;

a fuel nozzle having a hollow nozzle housing defining a fuel flow passage therethrough, a flow control valve mounted along said fuel flow passage and movable between a closed position preventing fuel flow therethrough and an open position permitting substantially unobstructed fuel flow through said fuel flow passage, and actuator means for engaging said receiver upon push-in reception of said nozzle into said fuel inflow port to move said shut-off valve plate to a position opening said fuel inflow port and to move said flow control valve to said open position;

said actuator means being responsive to pull-out removal of said nozzle from said fuel inflow port to move said flow control valve to said closed position;

hose means for connecting said nozzle housing to said pitside fuel tank; and a vent port unit adapted to be mounted on the race car and defining a vent port disposed generally at the top of said fuel cell, said vent port unit including a shut-off valve plate and means for biasing said shut-off valve plate to a normal position closing said vent port, a vent valve for releasibly engaging said vent port unit to open said vent port and thereby allow the car to be refueled via said fuel inflow port, and a recovery line for connecting said vent valve to said pitside fuel tank;

said vent port unit including a mounting ring defining said vent port, and wherein said vent valve includes a tubular valve body, a valve sleeve slidably carried on a leading end of said valve body, a valve member mounted on said valve body and cooperating therewith to define a radially open flow port, spring means for urging said valve sleeve to a normal position engaging said valve member and closing said flow port, a lock collar slidably carried on said valve sleeve, said spring means urging said lock collar normally to an advanced position, and detent means for preventing sliding movement of said valve sleeve relative to said valve body when said lock collar is in said advanced position, said lock collar engaging said mounting ring upon push-in engagement of a leading end of said vent valve with said vent port unit, whereby said lock collar is displaced relative to said valve sleeve to a retracted position, said detent means releasing said valve sleeve for sliding movement relative to said valve body when said lock collar is in said retracted position so that a stop member on said valve sleeve engages said mounting ring upon further push-in engagement of said vent valve with said vent port unit to move said valve sleeve against said spring means to open said flow port.

16. The refueling system of claim 15 further including a carrier sleeve slidably mounted on said valve body at the leading end thereof, said valve member comprising a first poppet valve mounted on and cooperating with said carrier sleeve to define said flow port, and further including a second poppet valve connected on a common stem with said first poppet valve and adapted to seat against a valve seat formed within said valve body, said carrier sleeve having a stop ring thereon for engagement by a trailing end of said valve sleeve upon movement of said valve sleeve to open said flow port to correspondingly move said carrier sleeve relative to said valve body to displace said second poppet valve to an open position.

17. The refueling system of claim 16 wherein said flow port and said second poppet valve are opened in sequence upon push-in engagement of said vent valve with said vent port unit, and are closed in a reverse sequence upon pull-out separation of said vent valve from said vent port unit.

18. A race car refueling system for delivering fuel to a fuel cell on the race car, said refueling system comprising:

a receiver adapted to be mounted on the race car and defining a fuel inflow port for delivery of fuel into the fuel cell, said receiver having a shut-off valve plate and means for biasing said shut-off valve plate to a normal position closing said fuel inflow port; and a fuel nozzle having a hollow nozzle housing defining a fuel flow passage therethrough, a flow control valve mounted along said fuel flow passage and movable between a closed position to prevent fuel flow therethrough and an open position to permit substantially unobstructed fuel flow therethrough, a nose valve mounted at a leading end of said nozzle housing and cooperating therewith to define a discharge passage having an open flow area at least equal to the cross sectional area of said said fuel flow passage, a valve sleeve slidably carried at the leading end of said nozzle housing, a first spring biasing said valve sleeve to a normal position engaging said nose valve and closing said discharge passage, a cam sleeve slidably carried at the leading end of said nozzle housing, cam means operated by said cam sleeve for moving said flow control valve to an open position upon retraction of said cam sleeve on said nozzle housing and for moving said flow control valve to a closed position upon advancement of said cam sleeve on said nozzle housing, and a second spring biasing said cam sleeve to a normal position closing said flow control valve;

said valve sleeve being engageable with said receiver upon push-in reception of said nose valve into said fuel inflow port to move said valve sleeve on said nozzle housing to a position opening said discharge passage, said cam sleeve being engageable with said receiver after said valve sleeve for retraction movement of said cam sleeve on said nozzle housing to move said flow control valve to said open position;

said cam sleeve and said valve sleeve being biased respectively by said second and first springs for return motion in sequence on said nozzle housing upon pull-out removal of said nose valve from said fuel inflow port for sequential closure of said flow control valve and said discharge passage.

19. The race car refueling system of claim 18 wherein said flow control valve comprises a ball valve having a bore formed therein with a size and shape for substantial conformance to the cross sectional size and shape of said fuel flow passage.

20. The race car refueling system of claim 18 wherein said shut-off valve plate defines an outwardly presented recess of generally conical shape, and further wherein said fuel nozzle includes a nose of generally conical shape for substantially mated and self-guiding reception into said recess in said shut-off valve plate when said fuel nozzle is received into said fuel inflow port.

21. The race car refueling system of claim 18 wherein said nose valve carries a nose piece of generally truncated conical shape for mated and self-aligned reception into a matingly shaped recess formed in said shut off valve plate.

22. The race car refueling system of claim 18 further including a generally circular hand ring mounted on said nozzle housing.

23. A race car refueling nozzle, comprising:

a hollow nozzle housing defining a fuel flow passage therethrough, a flow control valve mounted along said fuel flow passage and movable between a closed position to prevent fuel flow therethrough and an open position to permit substantially unobstructed fuel flow therethrough;

a nose valve mounted at a leading end of said nozzle housing and cooperating therewith to define a discharge passage having an open flow area at least equal to the cross sectional area of said fuel flow passage;

a valve sleeve slidably carried at the leading end of said nozzle housing;

a first spring biasing said valve sleeve to a normal position engaging said nose valve and closing said discharge passage;

a cam sleeve slidably carried at the leading end of said nozzle housing;

cam means operated by said cam sleeve for moving said flow control valve to an open position upon retraction of said cam sleeve on said nozzle housing and for moving said flow control valve to a closed position upon advancement of said cam sleeve on said nozzle housing; and a second spring biasing said cam sleeve to a normal position closing said flow control valve.

* * * * *